United States Patent
Proulx et al.

(10) Patent No.: US 9,448,735 B1
(45) Date of Patent: Sep. 20, 2016

(54) MANAGING STORAGE DEVICE REBUILD IN DATA STORAGE SYSTEMS

(71) Applicant: EMC Corporation, Hopkinton, MA (US)

(72) Inventors: Ronald D. Proulx, Boxborough, MA (US); Robert P. Foley, Clinton, MA (US); Peter Puhov, Shrewsbury, MA (US); Marc C. Cassano, Mendon, MA (US)

(73) Assignee: EMC Corporation, Hopkinton, MA (US)

( * ) Notice: Subject to any disclaimer, the term of this patent is extended or adjusted under 35 U.S.C. 154(b) by 447 days.

(21) Appl. No.: 14/145,125

(22) Filed: Dec. 31, 2013

(51) Int. Cl.
   *G06F 12/00* (2006.01)
   *G06F 13/00* (2006.01)
   *G06F 13/28* (2006.01)
   *G06F 3/06* (2006.01)
   *G06F 11/10* (2006.01)

(52) U.S. Cl.
   CPC ........... *G06F 3/0632* (2013.01); *G06F 3/0604* (2013.01); *G06F 3/0689* (2013.01); *G06F 3/0634* (2013.01); *G06F 11/1092* (2013.01)

(58) Field of Classification Search
   CPC ...... G06F 3/06; G06F 3/0632; G06F 3/0634; G06F 3/0605; G06F 3/0604; G06F 3/0607; G06F 3/0689; G06F 3/0683; G06F 11/1084; G06F 11/1088; G06F 11/1092; G06F 11/2069

USPC ....... 711/114, 161, 162; 712/6.2, 6.21, 6.22, 712/6.23, 6.25, 6.3, 6.31, 6.32
   See application file for complete search history.

(56) References Cited

U.S. PATENT DOCUMENTS

| | | | |
|---|---|---|---|
| 2003/0177309 A1* | 9/2003 | Kang ................... | G06F 11/1405 711/114 |
| 2009/0172273 A1* | 7/2009 | Piszczek ............. | G06F 11/1092 711/114 |
| 2013/0151769 A1* | 6/2013 | Childs ................. | G06F 11/1076 711/114 |

* cited by examiner

*Primary Examiner* — Yaima Rigol
*Assistant Examiner* — Shane Woolwine
(74) *Attorney, Agent, or Firm* — Krishnendu Gupta; Jason A. Reyes; John T. Hurley (57) ABSTRACT

A technique for managing storage device rebuild in a data storage system is disclosed. A RAID group having multiple drives with unique identifiers is provided. A drive in the RAID group that becomes inactive is identified and a timer is activated. A persistent bitmap is maintained, wherein the bitmap includes a plurality of bits and each bit indicates whether a corresponding portion of the identified drive has changed as a result of an I/O request issued while the drive is identified as inactive. If the inactive drive is subsequently identified as active before the timer expires, the timer is stopped and a rebuild procedure initiated, wherein only portions of the identified drive corresponding to bits in the bitmap are rebuilt. The bitmap is cleared and the RAID group is marked as healthy. If the timer expires before the identified drive become active, a full rebuild procedure is initiated.

20 Claims, 6 Drawing Sheets

MANAGING STORAGE DEVICE REBUILD IN DATA STORAGE SYSTEMS

BACKGROUND

1. Technical Field

This application relates generally to managing storage device rebuild in data storage systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation of Hopkinton, Mass. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a data storage system including a plurality of host interface units, disk drives, and disk interface units. The host systems access the data storage system through a plurality of channels provided therewith. Host systems provide data and access control information through the channels and the storage system provides data to the host systems also through the channels. The host systems do not address the disk drives of the storage system directly, but rather, access what appears to the host systems as a plurality of logical disk units. The logical disk units may or may not correspond to the actual disk drives. Allowing multiple host systems to access the single data storage system allows the host systems to share data stored in the storage system. In order to facilitate sharing of the data on the data storage system, additional software on the data storage systems may also be used.

SUMMARY OF THE INVENTION

A technique for managing storage device rebuild in a data storage system is disclosed. A RAID group having multiple drives with unique identifiers is provided. A drive in the RAID group that becomes inactive is identified and a timer is activated. A persistent bitmap is maintained, wherein the bitmap includes a plurality of bits and each bit indicates whether a corresponding portion of the identified drive has changed as a result of an I/O request issued while the drive is identified as inactive. If the inactive drive is subsequently identified as active before the timer expires, the timer is stopped and a rebuild procedure initiated, wherein only portions of the identified drive corresponding to bits in the bitmap are rebuilt. The bitmap is cleared and the RAID group is marked as healthy. If the timer expires before the identified drive become active, a full rebuild procedure is initiated.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
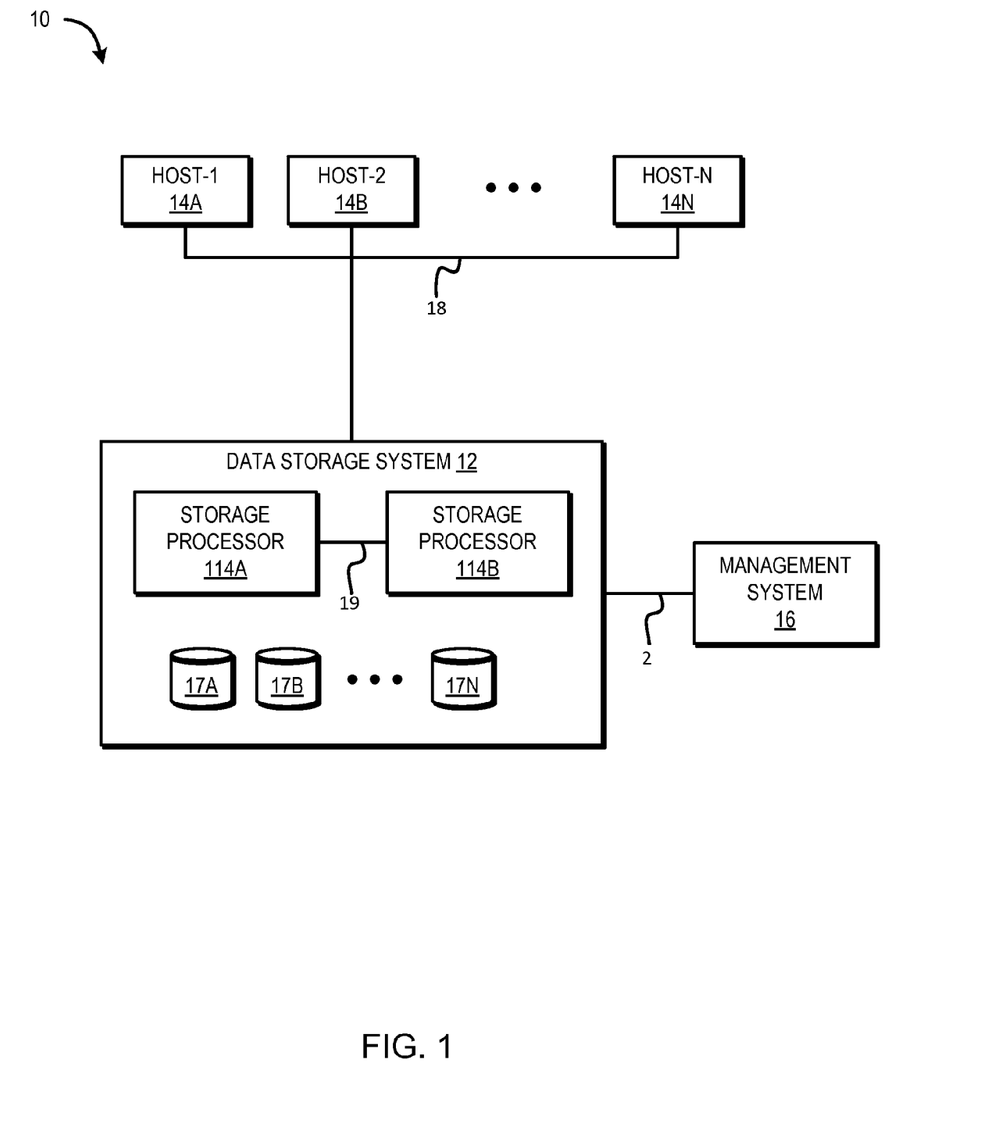
FIG. 1 is an example embodiment of a system that may utilize the techniques described herein.

FIG. 1 depicts an example embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a 14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a 14n may access and communicate with the data storage systems 12, and may also communicate with other components (not shown) that may be included in the system 10. In one embodiment, the communication medium 2 may be a LAN connection and the communication medium 18 may be an iSCSI, Fibre Channel, Serial Attached SCSI, or Fibre Channel over Ethernet connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 17a-17n. Unless noted otherwise, data storage devices may be used interchangeably herein to refer to hard disk drive, solid state drives, and/or other known storage devices. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of storage devices 17a-17n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

The data storage system may be a single unitary data storage system, such as single data storage array, including two storage processors or compute processing units. Techniques herein may be more generally use in connection with any one or more data storage system each including a different number of storage processors than as illustrated herein. The data storage system 12 may be a data storage array, such as a VNX® data storage array by EMC Corporation of Hopkinton, Mass., including a plurality of data storage devices 17a-17n and two storage processors 114A, 114B. The storage processors 114A, 114B may include a central processing unit (CPU) and memory and ports (not shown) for communicating with one or more physical or virtual hosts 14A-14N. The storage processor may be communicatively coupled via a communication medium such as storage processor bus 19. The storage processor units may be included in the data storage system 12 for processing requests and commands. In connection with performing techniques herein, an embodiment of the data storage system may include multiple storage processors including more than two storage processors as described. The VNX® data storage system mentioned above may include two storage processors 114A, 114B for performing processing in connection with servicing requests. Additionally, the two storage processors 114A, 114B may be used in connection with failover processing when communicating with the management system 16. Client software on the management system 16 may be used in connection with performing data storage system management by issuing commands to the data storage system 12 and/or receiving responses from the data storage system 12 over connection 2. In one embodiment, the management system 16 may be a laptop or desktop computer system.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Figure 2:
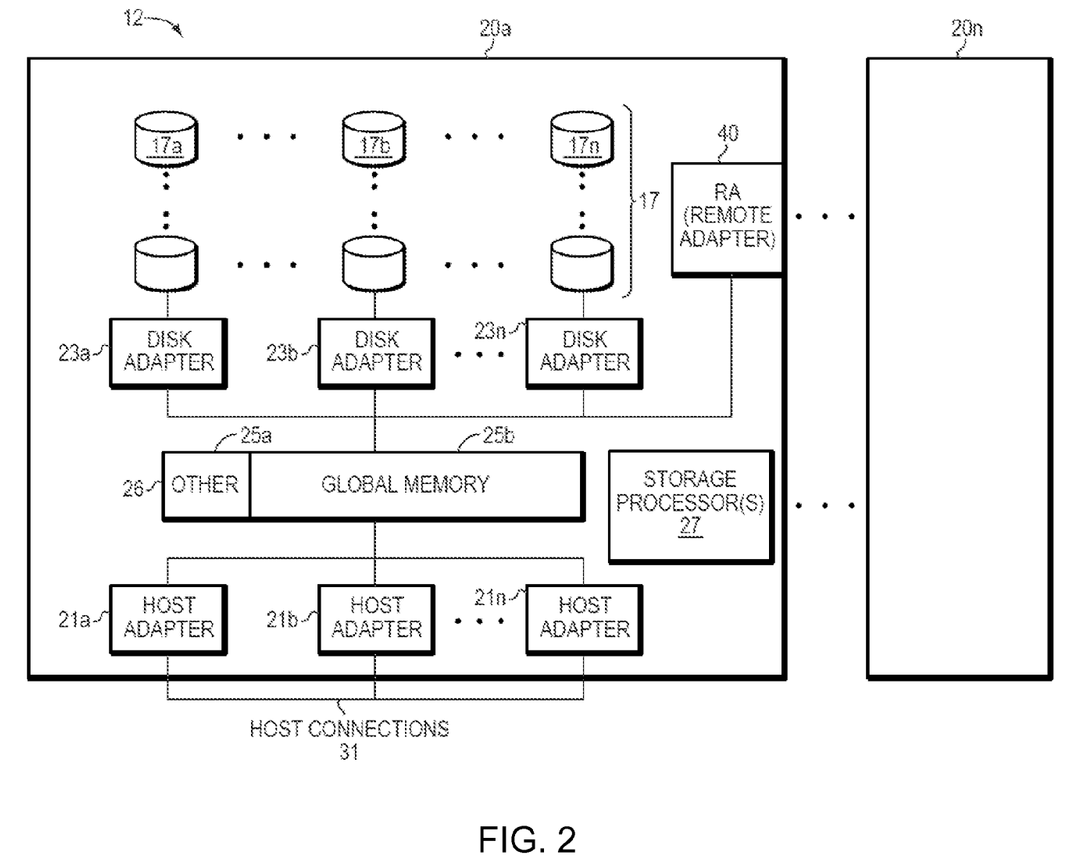
FIG. 2 is a diagram illustrating in more detail components of FIGS. 1 and 2 that may be used with the techniques described herein.

FIG. 2 illustrates an example of components of data storage system 12 that may be included in the system 10 of FIG. 1. The data storage system 12 of FIG. 2 includes one or more data storage systems 20a-20n as may be manufactured by one or more different vendors as noted above. Each of the data storage systems 20a-20n may be a data storage array inter-connected (not shown) to other data storage array(s). Additionally, as noted above, the data storage systems may also be connected to the host systems through any one or more communication connections 31. In this example, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 17 consisting of n rows or shelves of disks or more generally, data storage devices, 17a-17n. In this arrangement, each row of disks may be connected to a disk adapter ("DA") or director responsible for the backend management of operations to and from a portion of the disks 17. In the system 20a, a single DA, such as 23a, may be responsible for the management of a row of disks. In a data storage system such as by EMC Corporation of Hopkinton, Mass., a backend DA may also be referred to as a disk controller. The DA may perform operations such as reading data from, and writing data to, the physical devices which are serviced by the DA.

The system 20a may also include one or more storage processors 27. Each of the storage processors 27 may be CPU and an embodiment may include any number of such processors. For example, the data storage system may include two storage processors. The system 20a may also include one or more host adapters ("HAs") or directors 21a 21n. Each of the HAs may be used to manage communications and data operations between one or more host systems and global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems, various types of directors or adapters may be implemented as a processor, or, more generally, a component that includes the processor. Examples of directors are disk adapters (DAs), host adapters (HAs), remote adapters (RAs) and the like. A remote adapter 40 (RAs) may be hardware including a processor used to facilitate communication between data storage systems, such as between two of the same or different types of data storage systems.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Figure 3:
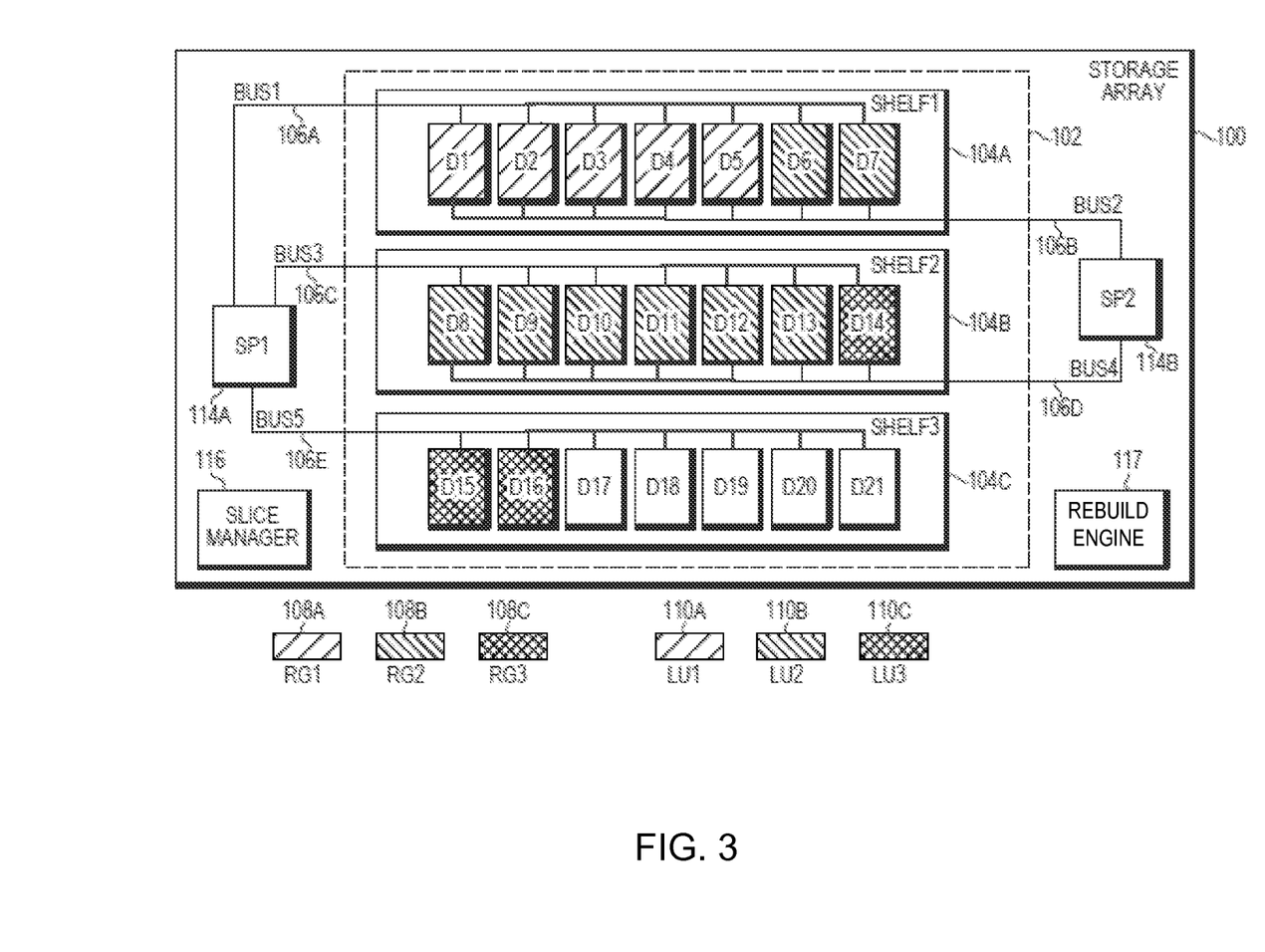
FIG. 3 is a diagram illustrating in more detail components of FIG. 1 that may be used with the techniques described herein.

FIG. 3 illustrates a storage array 100 that may include multiple storage devices 102, which are hard disk drives such as serial attached SCSI (SAS) drives, FibreChannel (FC) Drives, serial advanced technology attachment (SATA) drives flash drives, or some combination of the above. In one embodiment, storage devices 102 may be organized into multiple shelves 104, each shelf containing multiple storage devices. In the embodiment illustrated in FIG. 3, storage array 100 includes three shelves, Shelf1 104A, Shelf2 104B, and Shelf3 104C, each containing seven storage devices, D1-D21. In one embodiment, each storage device 102 may be dual ported devices and connected to each storage process via independent buses 106. In the embodiment illustrated in FIG. 3, each shelf 104 has two buses 106, each of which connects to every device 102 on shelf 104. For example, Shelf1 104A has two buses, Bus1 106A and Bus2 106B, where Bus1 106A is connected to devices D1-D7 and Bus2 106B is also connected to devices D1-D7. Similarly, Shelf2 104B has two buses, Bus3 106C and Bus4 106D, where Bus3 106C is connected to devices D8-D14 and Bus4 106D is connected to devices D8-D14. Lastly, Shelf3 104C has one bus, Bus5 106E, where Bus5 106E is connected to devices D15-D21. It may be appreciated that the configuration of storage array 100 as illustrated in FIG. 3 is for illustrative purposes only and is not to be considered a limitation of the subject matter described herein.

In addition to the physical configuration, storage devices 102 may also be logically configured. For example, multiple storage devices 102 may be organized into redundant array of inexpensive disks (RAID) groups, or RGs 108, shown in FIG. 3 being differently shaded as RG1 108A, RG2 108B, and RG3 108C. Storage devices D1-D5 are shown organized into a first RAID group, RG1 108A, while storage devices D6-D13 are organized into a second RAID group, RG2 108B, and storage devices D14-D16 are organized into a third RAID group, RG3 108C. In one embodiment, a RAID group may span multiple shelves and/or multiple buses. Although RAID groups are composed of multiple storage devices, a RAID group may be conceptually treated as if it were a single storage device.

Storage devices 102 may be managed by one or more storage processors 114. Storage processors (SPs) 114 may be responsible for allocating storage and maintaining information about how that allocated storage is being used; maintaining the map may be done by the storage processors. Storage processors 114 may maintain information about the structure of the file system whose contents are being stored in the allocated slices. For example, SP1 114A may be connected to bus1 106A, bus3 106C, and bus5 106E for managing disks D1-D3, D8-D11, and D15-D16. Similarly, SP2 114B may be connected to bus2 106B, and bus4 106D for managing disks D41-D7, and D12-D14. It may be appreciated that multiple SPs can manage all disks/buses at the same time but may coordinate with each other.

In addition to RAID groups, each logical unit 110 may be further subdivided into slices (not shown). In the embodiment illustrated in FIG. 3, RG1 108A/LU1 110A may be divided into multiple slices that may be allocated, deallocated, re-allocated, reserved, or relocated by slice manager 116. A slice may be, for example, a 1 GB slice of data. However, the techniques described herein should not be construed as being limited to only slices of data; the techniques are equally applicable to other data chunk sizes, such as blocks, slivers (subset of slices), page, file and the like.

Slice manager 116 may be a software application or layer that is executed, at least in part, by one or more SPs 114. Slice manager 116 may be responsible for implementing a slice allocation policy. For example, slice manager 116 may receive slice allocation requests, service slice allocation requests, and maintain relevant statistical information regarding slices. It may be appreciated that spreading data across multiple disk drives in an array allows for data to be read from the drives in parallel, increasing I\O performance.

In the event a drive associated with a RAID group becomes unavailable, data for the drive may need to be rebuilt. For example, employing techniques described herein, a drive may be temporarily removed and reinserted a short time later either in the same slot or a different slot in the same or different shelf 104. Data that was written to the drive while it was removed from the storage array may be rebuilt via a rebuild engine 117. As will be described in more detail below, the rebuild engine 117 may create and/or maintain a rebuild bitmap that may track sectors that would have been written to on the removed drive. If the drive is reinserted within a predetermined time period, the rebuild engine 17 may initiate a rebuild such that only the differential data is rebuilt, thereby dramatically reducing the rebuild time.

Figure 4:
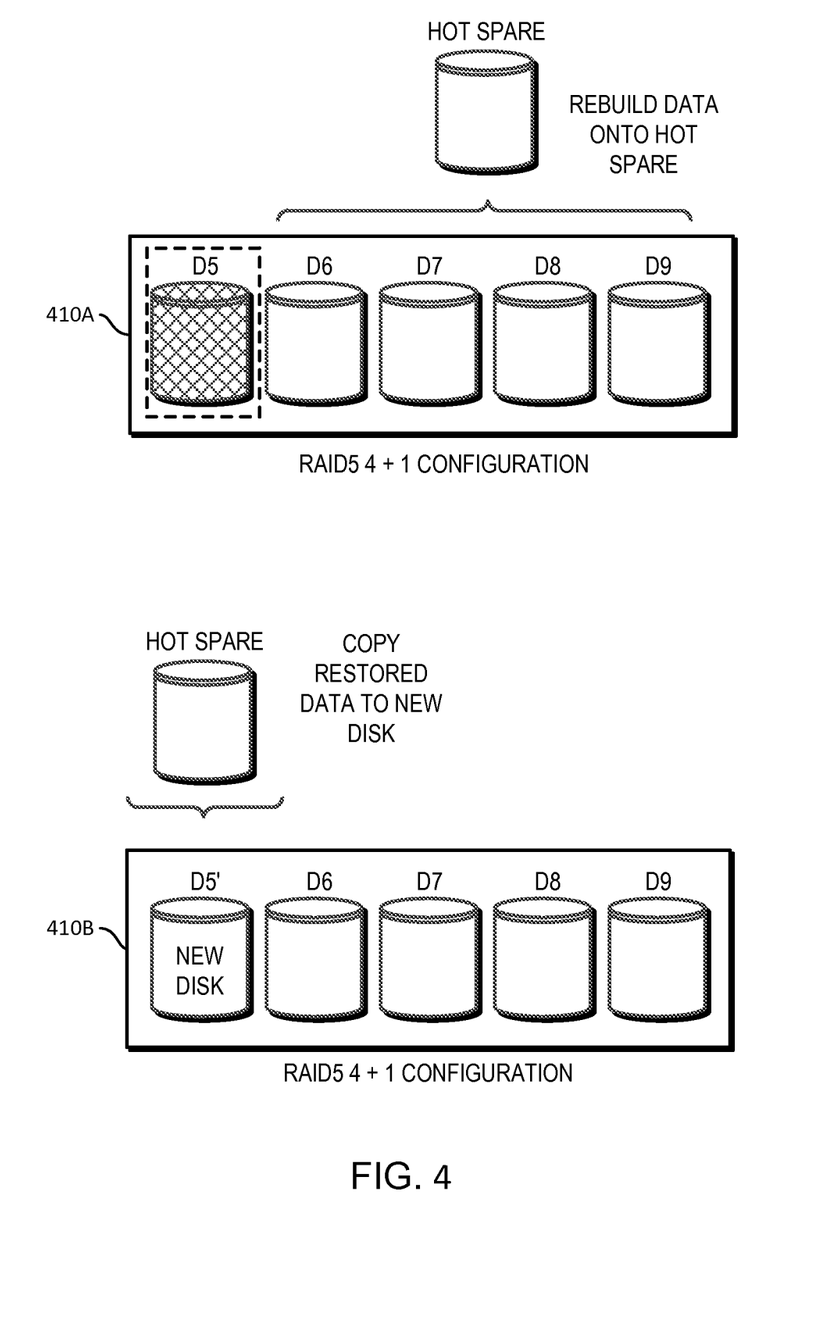
FIG. 4 is a diagram illustrating a full storage device rebuild procedure.

FIG. 4 illustrates a conventional method of rebuilding a drive in the event that drive is, for example, removed from the storage system or otherwise becomes unavailable. When a storage device in the data storage system is removed, a conventional restore and repair process, such as that shown in FIG. 4, may be employed. For example, when a RAID's 410 drive D5 is removed or otherwise unavailable, data stored on the unavailable drive is immediately rebuild onto a "hot spare" drive using parity information stored on the RAID's other remaining drives D6-D9. In this case, data is read, in a physically linear fashion, starting at logical block address 0 and continuing to the last logical block on the drive. Data is reconstructed, and then written to the hot spare so configured for that particular RAID group. The hot spare is the same type of hard disk drive and has a capacity equal to that of the largest drive in the RAID group. Thus, drives are mapped on a one-to-one basis and cannot be different types (e.g., cannot migrate from SAS RAID-5 to EFD RAID-6). Thereafter, the failed disk drive D5 is replaced and a new drive D5' is installed in the same slot, and an equalize process is performed where the restored data is copied from the hot spare back onto the newly replaced drive D5' in the corresponding RAID group 410B. Then, the hot spare is once again made available as a hot spare for its associated RAID group. Thus, data is effectively processed twice: first for the rebuild process and second for the equalize process.

During the rebuild time, the data storage system's performance is degraded. For example, the amount of time it takes for an application to retrieve data during the rebuild process can increase significantly, in part because they data storage system is trying to satisfy at least two tasks: rebuilding the failed drive's data and servicing application data requests (data which may also need to be reconstructed). Furthermore, some system architectures may cause data to become unavailable the moment the storage system becomes degraded (e.g., as required under certain data service level agreements).

The likelihood of irretrievable data loss is also increased during the rebuild time. For example, depending in the RAID type, should a second drive fail, parity data necessary for reconstructing data stored on the first failed drive will be lost, thereby preventing total data recovery resulting in permanent data loss. In addition, drive errors on any remaining drives that may not have been an issue because of redundancy can also cause data loss.

Storage capacity of various storage elements continues to grow at an ever increasing rate. The time it takes the rebuild process to complete is directly proportional to the size of the storage element, and, thus, rebuild time is increasing as drive capacity increases. Consequently, as storage capacity increases so too does the time a RAID group remains in a degraded mode as well as the amount of time data remains as risk.

Figure 5:
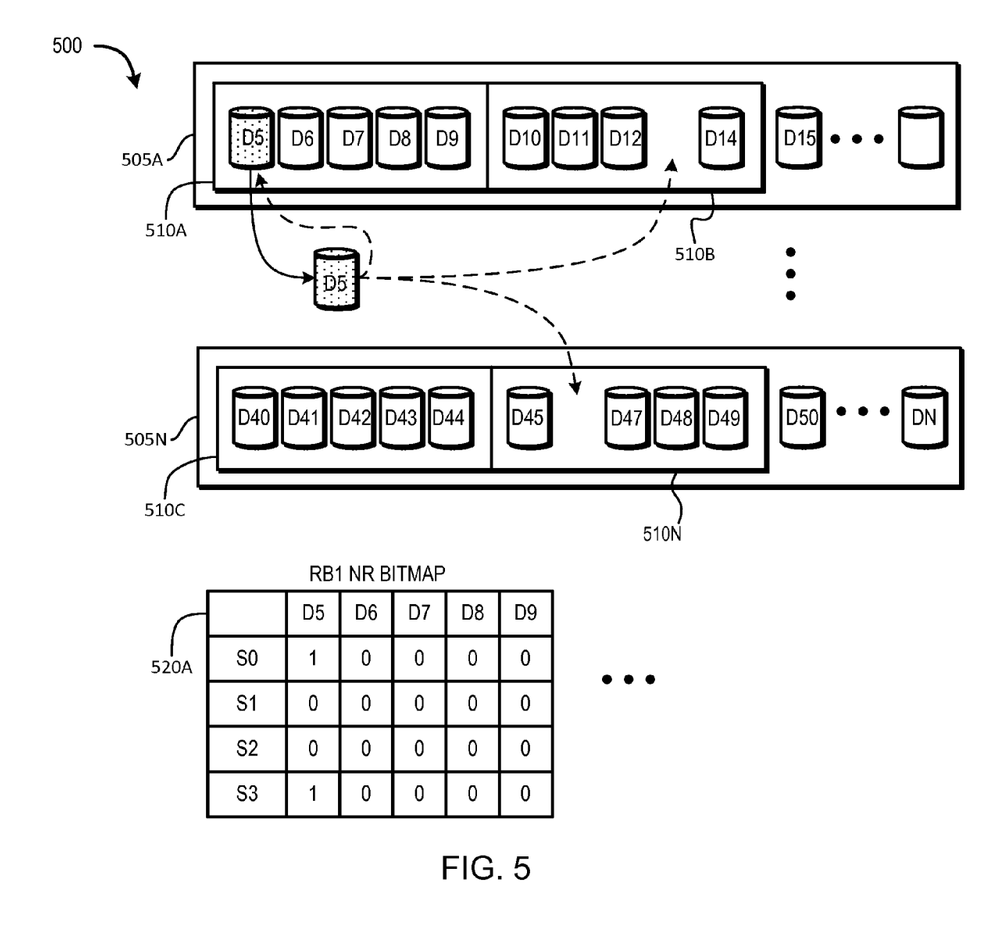
FIG. 5 is a diagram illustrating a partial storage device rebuild procedure that may utilize the techniques described herein.

FIG. 5 depicts an example embodiment illustrating techniques for reducing rebuild time when a drive in a RAID group becomes unavailable. The techniques enable tracking areas of a RAID group extent that have been modified after a drive becomes inactive. By waiting a small period of time before automatically replacing the inactive drive with a hot spare drive, a differential rebuild may be performed rather than a full rebuild. Thus, if the drive was accidentally removed or was temporarily taken offline (e.g., health check diagnostics, etc.) and then is re-inserted or comes back online before a 'Trigger Spare (TS) timer' period expires, a differential rebuild may be performed. Because only the sections that were modified while the drive was offline need to be rebuilt, the rebuild process is much faster. As a result is the RAID group is restored to full redundancy in a much short period of time thereby by improving system performance as well as reducing the amount of time data is a risk. In addition, consumption of a hot spare is avoided and is available for situations where the hot spare is necessary for a full rebuild.

The example embodiment illustrates storage array components 500 wherein a drive becomes inactive, such as when a drive is removed from a storage system and reinserted before a TS timer expires. Shown are RAID groups implementing a redundant RAID5 configuration in a 4+1 arrangement. For the purpose of discussion, a RAID5 configuration is presented; however, such a configuration should not be construed as a limitation as the techniques may be used with any other appropriate RAID or redundant drive configuration. Further, a storage array may include multiple different RAID and non-RAID arrangements.

Drives D5-DN may be arranged in rows of enclosures 510A-510N and particular drives may be configured or bound to a specific RAID group. Each drive may have a unique identifier that is used to associate each drive with its particular RAID group. For example, row 505A includes a RAID group 510A configured in a RAID5 arrangement that includes drives D5-D9. A storage array typically includes one or more rows 505A-505N where each row has multiple drives arranged in one or more various configurations. Each row contains a number of slots where drives are installed. A row may be completely populated or may have one or more empty slots such that a new drive can be installed therein (or an existing drive can be moved to the empty slot).

As shown, in this example, a user decides to physically remove drive D5 from RAID group1 510A. This may be done to reseat a drive, for load balancing purposes, debugging purposes, or a number of other reasons. The drive may also have been accidently removed where the user intended to remove a different drive. Alternatively, a drive may appear to have been removed in the event a cable came lose or is accidently removed or other path interruption.

Once the drive D5 is detected or identified as having been removed from the storage system, the RAID group 510A is marked as degraded, the TS timer (not shown) is activated, and a needs rebuild (NR) bitmap 520A is created or maintained in persistent memory. The NR bitmap 520A (also referred to as simply "bitmap") may be arranged such that a column is maintained for each drive in a particular RAID group and rows in each column correspond to sections (e.g., sectors, extents, blocks, objects, etc.) of a drive. For example, S0 may represent a section comprising 1 MB of data for a particular drive in a RAID group. Thus, S0 may represent the first X number of logical block addresses (LBA) corresponding to 1 MB worth of memory, S1 may represent the next X number of LBAs corresponding to the next MB worth of memory, and so on. Although the bitmap is illustrated as a table, any suitable data structure may be used when implementing the bitmap. When an I/O is directed to a section of the inactive drive that results in a change, a bit in the bitmap corresponding to the section is set. In this way, only sections that change are tracked and rebuild. In this example, bits corresponding with sections S0 and S3 for D5 are shown as being set, which indicates that sections of the drive D5 delineated by S0 and S3 have changed as a result of I/O operations. Consequently, when the NR bitmap 520A is scanned, only sections S0 and S3 are flagged as having changed.

If the removed drive is identified as being reinserted (i.e., becomes active) before the TS timer exceeds a predetermined time period (e.g., 5 minutes), the timer is stopped and bitmap logging stops. At this point, a partial (i.e., differential) rebuild may be performed whereby only changes that occurred while the drive was inactive are rebuilt. After the rebuild is complete, the bitmap may be cleared and the RAID group may be marked as healthy. It should be noted that the bitmap is a persistent bitmap, and consequently, will be maintained should the system be powered down. Thus, if a drive is removed, the system powered down, powered back up, and the drive reinserted, a partial rebuild may still be accomplished. Furthermore, the bitmap for a particular RAID group can be stored on the RAID group itself, thereby providing the ability to easily scale along with the number of RAID groups in a storage system.

Alternatively, or in addition, the user may decide to load balance the system whereby a drive D5 is moved to a different slot in the same enclosure 505A or a different enclosure 505N. However, in this scenario, because the drives D5-D9 are bound to the RAID group 510A using a unique identifier rather than a specific slot of a specific enclosure, if the drive D5 is reinserted before expiration of the TS timer, the drive D5 is recognized and associated with its RAID group 510A. As such, a partial rebuild may be performed with the drive D5 installed in a different slot as was described above.

Alternative example embodiments may include scenarios where a user or system process intentionally places a drive in an inactive state. For example, a drive may be placed in an inactive state to preform health-check procedures and/or routine or preventative diagnostic operations. Some drives may include their own internal maintenance diagnostic routines that can to run to keep the drive in optimal operating condition. However, I/O demands on the drive may be such that the drive does not have sufficient opportunity to perform these routines. By intentionally placing these types of drives off-line and allowing them to perform such operations can improve the overall performance of the storage system. Examples may include health-check, defragmentation and bad sector repair on hard disk drives and wear-leveling on solid state flash drives, among others. These routines may be initiated on drives performing properly, that is, they are not limited to being run on only drives that are in an error state or undergoing a firmware upgrade, for instance. In these examples, the partial rebuild techniques described herein may be similarly implemented.

Figure 6:
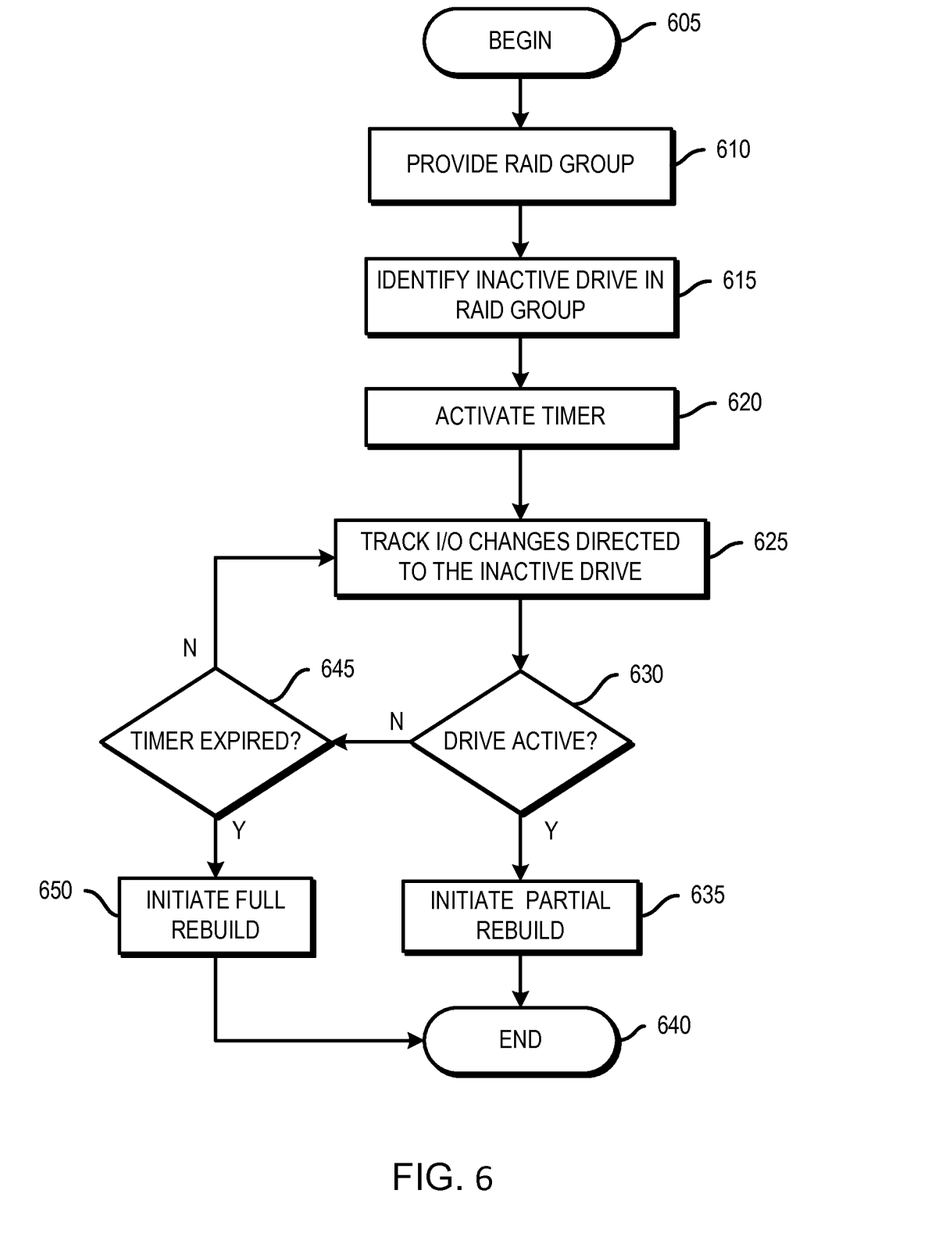
FIG. 6 is a flowchart of a method that may utilize the techniques described herein.

FIG. 6 is a flow diagram that illustrates an example method for use in implementing techniques described herein to significantly reduce rebuild time in the event a drive in a RAID group becomes available. While various methods disclosed herein are shown in relation to a flowchart or flowcharts, it should be noted that any ordering of method steps implied by such flowcharts or the description thereof is not to be construed as limiting the method to performing the steps, or sub-steps within or among the steps, in that order. Rather, the various steps of each of the methods disclosed herein can be performed in any of a variety of sequences. In addition, as the illustrated flowcharts are merely example embodiments, various other methods that include additional steps or include fewer steps than illustrated are also within the scope of the present invention.

As shown, the method can begin at step 605. The method can be configured to run automatically as part of a storage system operating software or the like. Alternative, or in addition, the method may be initiated manually by a user, for example, by clicking on a button or other object in a graphical user interface (GUI) associated with a management system or by entering a command in a command-line-interface. Execution of the method can also be based on various user-specified parameters. For example, a user can specify a timeout value or other configurable parameter.

At step 610, one or more RAID groups having multiple drives may be provided such as the RAID5 configuration as was described above or may be any other appropriate RAID configuration. Each drive in the RAID group is associated with a unique identifier, such as a serial number, manufacturing code, or other similar identifiers unique to the drives.

At step 615, the method identifies that a drive in the RAID group has become inactive as a result of being physically removed for the storage system (e.g., pulled out of its slot or a path disruption) or intentionally placed in an inactive state (e.g., to perform health-check operations or routine maintenance operations). Once the drive has been identified as inactive, a TS timer is activated at step 620. The TS timer may be set to equal a predetermined time period, such as, for example, 5 minutes. The time period may also be modifiable by a user or system process, either statically prior to execution of the method or dynamically whereby a modifiable variable gets checked during execution of the method. For example, the method may determine that a drive has failed, and the timer may be set to zero or otherwise deactivated, thereby by immediately executing a rebuild procedure.

At step 625, the method tracks I/O changes directed to the inactive drive. The method maintains a persistent bitmap where the bitmap includes bits that get set or otherwise indicate when a corresponding section of the drive gets changed as a result of a write operation directed to the drive. The bitmap is maintained and updated as necessary to reflect any changes that occur to sections of the inactive drive.

A determination is made a step 630 to determine if the inactive drive is identified as becoming active, and if so, the method proceeds to step 635 where a partial or differential rebuild is initiated, and the method ends at step 640. However, at step 630 if a determination is made that the drive remains inactive, the method proceeds to step 645 where a determination is made to determine whether the TS timer has expired, and if so, the method proceeds to step 650 where a full rebuild is initiated and the method stops at step 640. Conversely, if at step 645 a determination is made that the TS timer has not expired (i.e., is still active), the method loops back to step 625 and continues in a similar manner as described above.

Thus, in an example embodiment, a method for managing drive rebuild in a data storage system may be employed using the techniques described herein. The techniques may include, for example, providing a RAID group having multiple drives, wherein each drive in the RAID group is associated with a unique identifier such as a serial number. A drive in the RAID group that has become inactive may be identified, where the RAID group is marked as being in a degraded state and a timer is activated. A persistent bitmap is created and/or maintained and includes a plurality of bits where each bit indicates whether a corresponding portion of the identified drive has changed as a result of an I/O request issued to the inactive drive while the drive is identified as such. If the inactive drive is subsequently identified as active (e.g., reinstalled) before the timer expires, the timer is stopped and a differential rebuild procedure may be performed. The bitmap may be cleared or otherwise reset and the RAID group may now be marked healthy. However, if the timer expires before the identified drive become active, it may be assumed that drive has indeed failed, a full rebuild procedure is performed.

In alternative example embodiments, the bitmap may stored in the RAID group associated with the identified drive. The unique identifier may be associated with a serial number corresponding to the drive. A drive may be identified as inactive as a result of the drive being physically removed for the storage system and reinserted back into the same or a different slot.

Other alternative example embodiments may include implementations where drive is identified as inactive as a result of the drive being intentionally placed in an off-line state to perform various diagnostic procedures, and if the drive is determined to have failed or marked to be replaced, the technique may be halted early (i.e., before the timer expires) and a full rebuild may be initiated. Other embodiments may further include determining that a drive having a different identifier has been inserted in place of the inactive drive, and full rebuild procedure may be initiated. The timer may be associated with a predetermined variable, a user or system modifiable variable, or a user or system dynamically modifiable variable that can be increased or decreased while the technique is being performed.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the FIGs illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), Flash memory, an optical fiber, a portable compact disc read-only memory (CD-ROM), an optical storage device, digital versatile disc ROM (DVD-ROM) a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for managing drive rebuild in a data storage system, the method comprising:
    providing a RAID group having multiple drives, wherein each drive in the RAID group is associated with a unique identifier;
    identifying a drive in the RAID group that has become inactive, wherein the RAID group is marked as being in a degraded state;
    activating a timer;
    maintaining a persistent bitmap, wherein the bitmap includes a plurality of bits and each bit indicates whether a corresponding portion of the identified drive has changed as a result of an I/O request issued while the drive is identified as inactive;
    if the inactive drive is subsequently identified as active before the timer expires, stopping the timer and initiating a rebuild procedure, wherein only portions of the identified drive corresponding to bits in the bitmap are rebuilt;
    clearing the bitmap and marking the RAID group as being in a healthy state; and
    else if the timer expires before the identified drive become active, initiating a full rebuild procedure.

2. The method of claim 1, wherein the bitmap is stored on the RAID group associated with the identified drive.

3. The method of claim 1, wherein the unique identifier is associated with a serial number corresponding to the drive.

4. The method of claim 1, wherein the drive is identified as inactive as a result of the drive being physically removed from the storage system.

5. The method of claim 1, wherein the drive is identified as inactive as a result of the drive being physically removed from the storage system and identified as active after being reinserted into a different slot.

6. The method of claim 1, wherein the drive is identified as inactive as a result of the drive being intentionally placed in an off-line state.

7. The method of claim 1, further including:
    placing the drive in an off-line state;
    performing one or more diagnostic procedures on the drive;
    determining the drive has failed; and
    deactivating the timer and initiating a full rebuild.

8. The method of claim 1, further including determining that a drive having a different identifier has been inserted and executing a full rebuild procedure.

9. The method of claim 1, wherein the timer is associated with a modifiable variable.

10. The method of claim 1, wherein the timer is a dynamically modifiable variable.

11. A system for managing drive rebuild in a data storage system, the system configure to:
    provide a RAID group having multiple drives, wherein each drive in the RAID group is associated with a unique identifier;
    identify a drive in the RAID group that has become inactive, wherein the RAID group is marked as being in a degraded state;
    activate a timer;
    maintain a persistent bitmap, wherein the bitmap includes a plurality of bits and each bit indicates whether a corresponding portion of the identified drive has changed as a result of an I/O request issued while the drive is identified as inactive;
    if the inactive drive is subsequently identified as active before the timer expires, stop the timer and initiate a rebuild procedure, wherein only portions of the identified drive corresponding to bits in the bitmap are rebuilt;
    clear the bitmap and mark the RAID group as being in a healthy state; and
    else if the timer expires before the identified drive become active, initiate a full rebuild procedure.

12. The system of claim 11, wherein the bitmap is stored on the RAID group associated with the identified drive.

13. The system of claim 11, wherein the unique identifier is a serial number corresponding to the drive.

14. The system of claim 11, wherein the drive is identified as inactive as a result of the drive being physically removed from the storage system.

15. The system of claim 11, wherein the drive is identified as inactive as a result of the drive being physically removed from the storage system and identified as active after being reinserted into a different slot.

16. The system of claim 11, wherein the drive is identified as inactive as a result of the drive being intentionally places in an off-line state.

17. The system of claim 11, further configured to:
place the drive in an off-line state;
perform one or more diagnostic procedures on the drive;
determine the drive has failed; and
deactivate the timer and initiate a full rebuild.

18. The system of claim 11, further configured to determine that a drive having a different identifier than the identified drive has been inserted and execute a full rebuild procedure.

19. The system of claim 11, wherein the timer selected from the group consisting of: predetermined variable, user selected variable, modifiable variable, and dynamically modifiable variable.

20. A non-transitory computer readable medium comprising executable code stored thereon for building a code entity, the non-transitory computer readable medium comprising executable code for:

providing a RAID group having multiple drives, wherein each drive in the RAID group is associated with a unique identifier;

identifying a drive in the RAID group that has become inactive, wherein the RAID group is marked as being in a degraded state;

activating a timer;

maintaining a persistent bitmap, wherein the bitmap includes a plurality of bits and each bit indicates whether a corresponding portion of the identified drive has changed as a result of an I/O request issued while the drive is identified as inactive;

if the inactive drive is subsequently identified as active before the timer expires, stopping the timer and initiating a rebuild procedure, wherein only portions of the identified drive corresponding to bits in the bitmap are rebuilt;

clearing the bitmap and marking the RAID group as being in a healthy state; and else if the timer expires before the identified drive become active, initiating a full rebuild procedure.

* * * * *